US012576881B2

(12) United States Patent
Rosman et al.

(10) Patent No.: US 12,576,881 B2
(45) Date of Patent: Mar. 17, 2026

(54) METHOD FOR POLYNOMIAL BASED PREDICTIONS OF EGO VEHICLES AND ADVERSARIAL AGENTS

(71) Applicant: TOYOTA RESEARCH INSTITUTE, INC., Los Altos, CA (US)

(72) Inventors: Guy Rosman, Newton, MA (US); Xin Huang, Cambridge, MA (US); Igor Gilitschenski, Toronto (CA)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 182 days.

(21) Appl. No.: 18/485,591

(22) Filed: Oct. 12, 2023

(65) Prior Publication Data

US 2025/0121848 A1     Apr. 17, 2025

(51) Int. Cl.
*B60W 60/00*          (2020.01)

(52) U.S. Cl.
CPC ... *B60W 60/001* (2020.02); *B60W 2554/4029* (2020.02)

(58) Field of Classification Search
None
See application file for complete search history.

(56) References Cited

U.S. PATENT DOCUMENTS

2018/0257647 A1* 9/2018 Jurca .............. G01S 13/931
2019/0072973 A1* 3/2019 Sun .............. B62D 15/025

2020/0089246 A1* 3/2020 McGill, Jr. .......... G05D 1/0221
2021/0035310 A1* 2/2021 Choi ................... G06T 7/251
2024/0420474 A1* 12/2024 Kikuchi ............... G06V 20/52

OTHER PUBLICATIONS

Peng, et al., "A Learning-Based Projection Method for Model Order Reduction of Transport Problems," arXiv:2105.14633v2 [math. NA], Dec. 31, 2021.
Yao, et al., "Deep Learning for Functional Data Analysis with Adaptive Basis Layers," Proceedings of the 38th International Conference on Machine Learning, 2021, found at http://proceedings. mlr.press/v139/yao21c/yao21c.pdf.
Krolicki, et al., "Supervised DKRC with Images for Offline System Identification," arXiv:2109.02241v1 [cs.LG], Sep. 6, 2021.

* cited by examiner

*Primary Examiner* — Donald J Wallace
*Assistant Examiner* — Paysun Wu
(74) *Attorney, Agent, or Firm* — SEYFARTH SHAW LLP

(57)          ABSTRACT

A method for a driver prediction system is described. The method includes training a neural network to a learn a set of polynomial basis functions. The method also includes selecting, using a trained neural network, a learned polynomial basis function to perform a prediction of an action of an autonomous dynamic object (ADO) agent. The method further includes computing projection coefficients of the learned polynomial basis function to weigh the learned polynomial basis function. The method also includes using the projection coefficients of the learned polynomial basis function to weigh the learned polynomial basis function to provide a distribution regarding a likelihood of the prediction of the action of the ADO agent.

20 Claims, 9 Drawing Sheets

METHOD FOR POLYNOMIAL BASED PREDICTIONS OF EGO VEHICLES AND ADVERSARIAL AGENTS

BACKGROUND

Field

Certain aspects of the present disclosure relate to autonomous vehicle technology and, more particularly, to polynomial based predictions of ego vehicles and adversarial agents.

Background

Autonomous agents rely on machine vision for sensing a surrounding environment by analyzing areas of interest in a scene from images of a surrounding environment. Although scientists spent decades studying the human visual system, a solution for realizing equivalent machine vision remains elusive, but is a goal for enabling truly autonomous agents. Machine vision, however, is distinct from the field of digital image processing. In particular, machine vision involves recovering a three-dimensional (3D) structure of the world from images and using the 3D structure for fully understanding a scene. That is, machine vision strives to provide a high-level understanding of a surrounding environment, as performed by the human visual system.

Autonomous agents, such as driverless cars and robots, are quickly evolving and have become a reality. Because autonomous agents have to interact with humans, however, many critical concerns arise. For example, how to design vehicle control of an autonomous vehicle using machine learning. Unfortunately, vehicle control by machine learning is less effective in complicated traffic environments involving complex interactions between vehicles (e.g., a situation where a controlled (ego) vehicle merges/changes onto/into a traffic lane).

Machine learning techniques for driver modeling to enable vehicle control using a network to select vehicle control actions for an ego vehicle are desired. Conventional machine learning techniques for driver modeling do not compute the likelihood of a given trajectory or the dependency between timesteps. A driver modeling system that predicts (1) the actions of the ego/adversary vehicle and (2) the likelihood that the ego/adversary vehicle performs a specific action, is desired.

SUMMARY

A method for a driver prediction system is described. The method includes training a neural network to a learn a set of polynomial basis functions. The method also includes selecting, using a trained neural network, a learned polynomial basis function to perform a prediction of an action of an autonomous dynamic object (ADO) agent. The method further includes computing projection coefficients of the learned polynomial basis function to weigh the learned polynomial basis function. The method also includes using the projection coefficients of the learned polynomial basis function to weigh the learned polynomial basis function to provide a distribution regarding a likelihood of the prediction of the action of the ADO agent.

A non-transitory computer-readable medium having program code recorded thereon for a driver prediction system is described. The program code is executed by a processor. The non-transitory computer-readable medium includes program code to train a neural network to a learn a set of polynomial basis functions. The non-transitory computer-readable medium also includes program code to select, using a trained neural network, a learned polynomial basis function to perform a prediction of an action of an autonomous dynamic object (ADO) agent. The non-transitory computer-readable medium further includes program code to compute projection coefficients of the learned polynomial basis function to weigh the learned polynomial basis function. The non-transitory computer-readable medium also includes program code to use the projection coefficients of the learned polynomial basis function to weigh the learned polynomial basis function to provide a distribution regarding a likelihood of the prediction of the action of the ADO agent.

A system for a driver prediction system is described. The system includes a basis function network model to train a neural network to a learn a set of polynomial basis functions. The system also includes a vehicle action prediction module to select, using a trained neural network, a learned polynomial basis function to perform a prediction of an action of an autonomous dynamic object (ADO) agent. The system further includes a projection coefficient computation module to compute projection coefficients of the learned polynomial basis function to weigh the learned polynomial basis function. The system also includes a vehicle action likelihood module to use the projection coefficients of the learned polynomial basis function to weigh the learned polynomial basis function to provide a distribution regarding a likelihood of the prediction of the action of the ADO agent.

This has outlined, broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
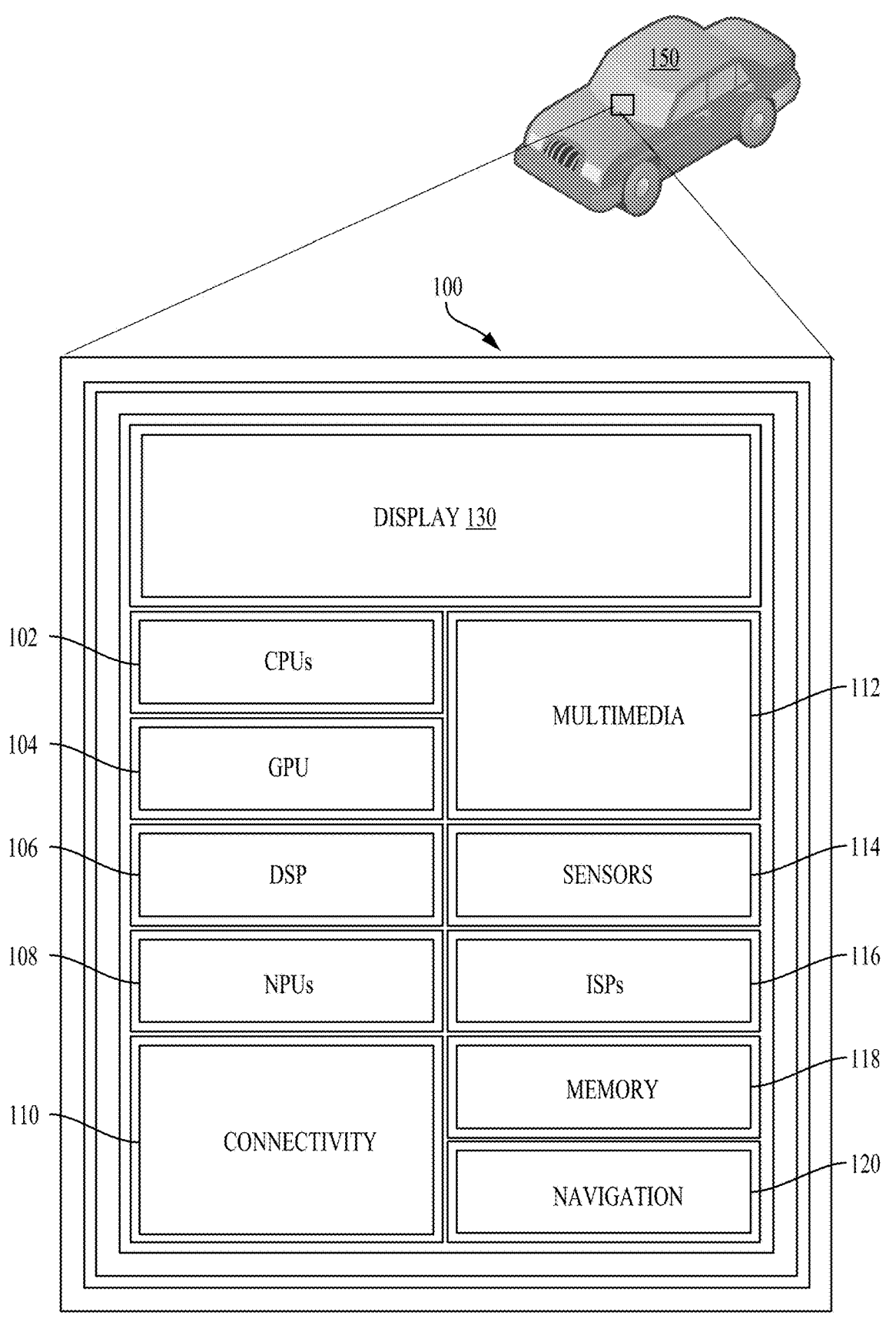
FIG. 1 illustrates an example implementation of designing a neural network using a system-on-a-chip (SOC) for a learned polynomial basis function driver prediction system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be universally applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Traffic congestion on highways affects millions of people and presents an urgent problem to solve. In particular, vehicles at highway merging sections (e.g., on-ramp and land-drop bottlenecks) perform lane changes, which may generate traffic oscillations and extra congestion. Both main-lane and on-ramp traffic are potentially congested due to irregular lane change behavior and unexpected braking maneuvers of surrounding vehicles. Automated vehicles are expected to reduce traffic accidents and improve traffic efficiency. In particular, automation of vehicle control on highways is rapidly advancing, which may eventually reduce traffic accidents and improve traffic efficiency.

In parallel autonomy systems, a human driver and an autonomous system share control of a vehicle. When a driver's actions place the vehicle and the surroundings of the vehicle at risk, the autonomous system is triggered to intervene and provide an alternative action for avoiding a calamity. Successful planning of these alternative actions for the vehicle during intervention by the autonomous system involves knowledge of a driver's intention. In particular, trajectory prediction of the vehicle is a vital component in improving advanced driver-assistance systems (ADAS) to enhance vehicle safety.

Trajectory prediction is difficult in complicated traffic environments. For example, these traffic environments may involve complex interactions between vehicles, including situations where a controlled (ego) vehicle maneuvers into and out of traffic lanes. Conventional ADAS techniques for vehicle control may use a network to select an appropriate vehicle control action from input data relative to the ego vehicle. For example, a selected speed/acceleration/steering angle of the controlled (ego) vehicle may be applied as a vehicle control action to perform a vehicle control maneuver. Unfortunately, conventional ADAS techniques do not consider inherent uncertainty.

Several properties are specified for successful and actionable prediction of a human driver's intent. For example, prediction models reason about the inherent uncertainty of a future trajectory in both the immediate term and the longer term. In particular, these prediction models leverage all available sensory cues and use these sensory cues to reason about when the risk of the driver's control choices outweigh the risk of ADAS intervention. While conventional trajectory prediction algorithms output deterministic results efficiently, these methods fail to capture the uncertain nature of human actions.

Probabilistic predictions are extremely useful in many safety-critical tasks such as collision checking and risk-aware motion planning. For example, probabilistic predictions can express both the intrinsically uncertain prediction task at hand (e.g., human nature) and reasoning about the limitations of the prediction method (e.g., knowing when an estimate could be wrong). Incorporating uncertainties into prediction results may be performed by data-driven approaches that learn common characteristics from datasets of demonstrated trajectories. Unfortunately, these methods often express unimodal predictions, which may not perform well in scenarios where the driver can choose among multiple actions.

Current technologies may rely on a long short-term memory (LSTM), such as a social generative adversarial network (GAN), multilayer-perceptron (MLP), and/or polynomial-based models to perform prediction. Regarding uncertainty estimates, GAN and/or variational autoencoder (VAE) based samples or per-timestep covariance functions are usually utilized. These GAN and/or VAE based samples, however, do not compute the likelihood of a given trajectory (e.g., for driver modeling). Furthermore, per-timestep covariance functions ignore the dependency between timesteps.

By contrast, some aspects of the present disclosure utilize learned polynomial basis functions to allow for an efficient representation of non-IID (independent and identically distributed) covariance with a simple projection and matrix-vector multiplications. These aspects of the present disclosure propose the broad concept of using learned polynomial basis functions to perform a prediction with a trajectory basis and/or a set of trajectory functions. For example, the learned polynomial basis functions are generated by a network, and the prediction is done in a low-dimensional space using a projection onto the learned polynomial basis functions. Additionally, the decoder generates the basis function, with a pointer network, to perform "low rank" representations.

In some aspects of the present disclosure, a prediction of an ego/adversary vehicle is performed with a function selected using a neural network, such as an LSTM (long short-term memory) network. Depending on the function selected by the LSTM network, coefficients of the selected function are subsequently used to weigh the selected function to provide a distribution regarding a prediction of the actions of the ego/adversary vehicle. Unlike the prior art, this methodology of performing predictions provides the ability to determine the following: (1) the actions the ego/adversary vehicle can perform and (2) the likelihood that the ego/adversary vehicle will perform a specific action. These aspects of the present disclosure are supported using learned polynomial basis functions, which allow for an efficient representation of non-IID covariance with a simple projection and matrix-vector multiplications.

FIG. 1 illustrates an example implementation of the aforementioned system and method for a learned polynomial basis function driver prediction system using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle behavior control action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include program code to learn polynomial basis functions to enable vehicle trajectory prediction based on images processed by the sensor processor 114.

The instructions loaded into a processor (e.g., CPU 102) may also include program code to train a neural network to a learned set of polynomial basis functions. The instructions loaded into a processor (e.g., CPU 102) may also include program code to select, using a trained neural network, a learned polynomial basis function to perform a prediction of an action of an ego/adversary vehicle. The instructions loaded into a processor (e.g., CPU 102) may also include program code to compute projection coefficients of the selected polynomial basis function to weigh the selected polynomial basis function. The instructions loaded into a processor (e.g., CPU 102) may also include program code to use the projection coefficients of the selected polynomial basis function to weigh the selected polynomial basis function to provide a distribution regarding the prediction of the action of the ego/adversary vehicle.

Figure 2:
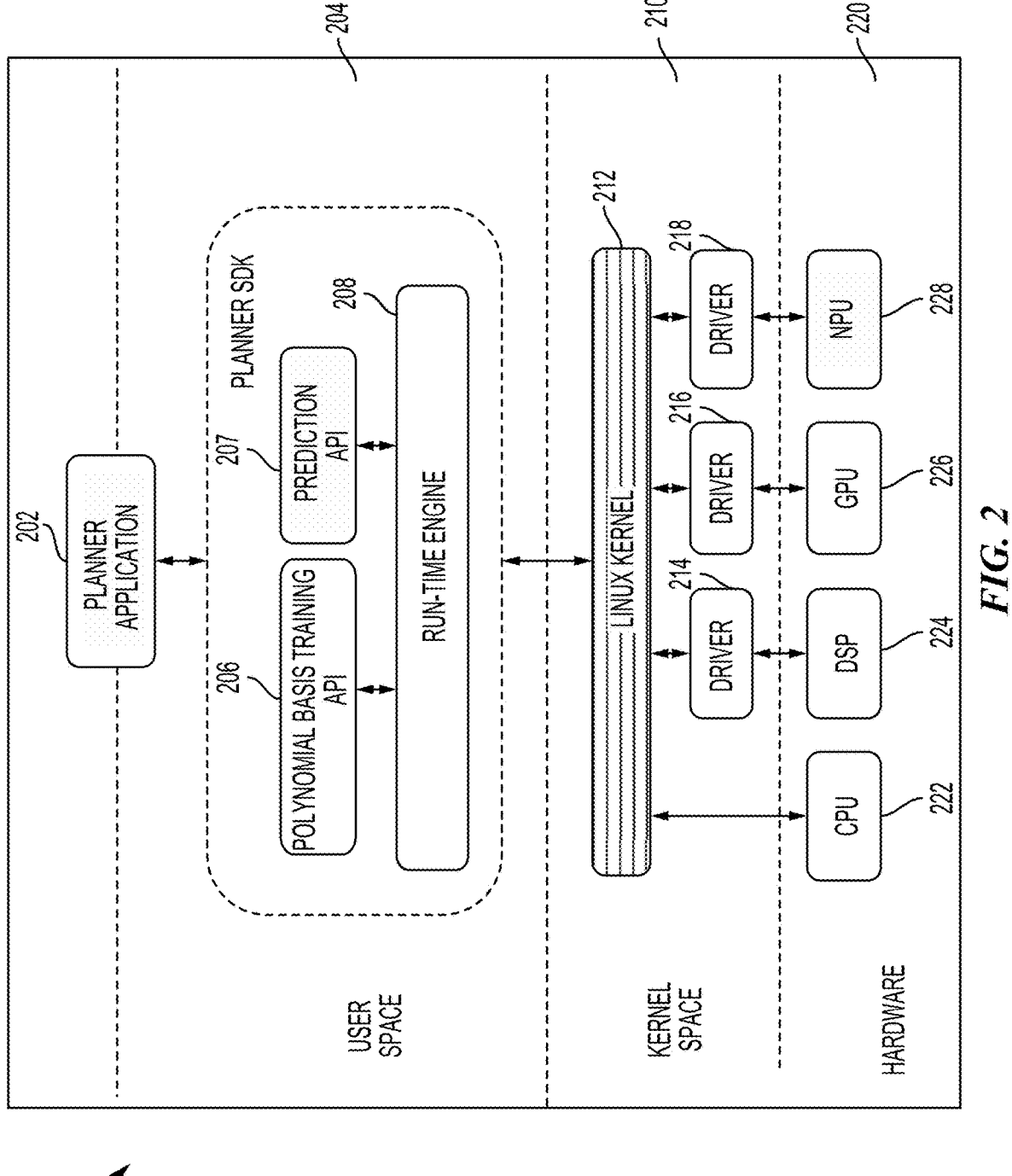
FIG. 2 is a block diagram illustrating a software architecture that may modularize artificial intelligence (AI) functions for a learned polynomial basis function driver prediction system, according to aspects of the present disclosure.

FIG. 2 is a block diagram illustrating a software architecture 200 that may modularize artificial intelligence (AI) functions for a learned polynomial basis function driver prediction system, according to aspects of the present disclosure. Using the architecture, a planner application 202 may be designed such that it may cause various processing blocks of a system-on-a-chip (SOC) 220 (for example a CPU 222, a DSP 224, a GPU 226, and/or an NPU 228) to perform supporting computations during run-time operation of the planner application 202. While FIG. 2 describes the software architecture 200 for a learned polynomial basis function vehicle action prediction, it should be recognized that the vehicle action prediction functionality is not limited to autonomous agents. According to aspects of the present disclosure, the driver prediction functionality is applicable to any vehicle type, provided the vehicle is equipped with appropriate functions of an advanced driver assistance system (ADAS).

The planner application 202 may be configured to call functions defined in a user space 204 that may, for example, provide for vehicle action prediction services, such as vehicle trajectory prediction. The planner application 202 may make a request to compile program code associated with a library defined in a polynomial basis training application programming interface (API) 206. The polynomial basis training API 206 may be conformed to train a neural network to a learned set of polynomial basis functions. The planner application 202 may make a request to compile program code associated with a library defined in a prediction API 207. The prediction API 207 may use the trained neural network to select a learned polynomial basis function for performing a prediction of an action of an ego/adversary vehicle.

A run-time engine 208, which may be compiled code of a runtime framework, may be further accessible to the planner application 202. The planner application 202 may cause the run-time engine 208, for example, to take actions for prediction actions of a vehicle. When prediction of a vehicle trajectory is desired, the run-time engine 208 may in turn send a signal to an operating system 210, such as a Linux Kernel 212, running on the SOC 220. FIG. 2 illustrates the Linux Kernel 212 as software architecture for implementing planning of the vehicle using learned polynomial basis function. It should be recognized, however, that aspects of the present disclosure are not limited to this exemplary software architecture. For example, other kernels may be used to provide the software architecture to support vehicle control action selection functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
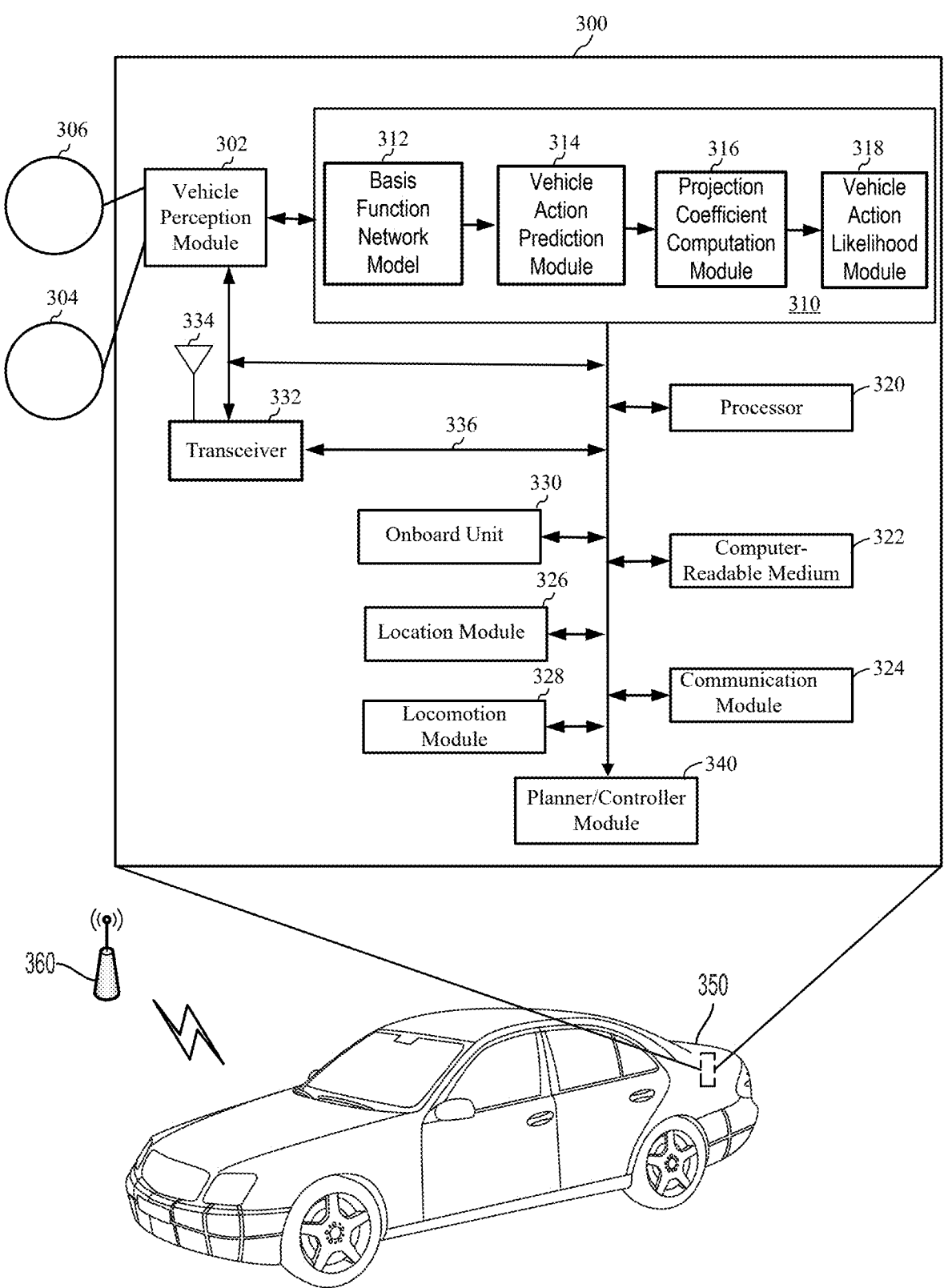
FIG. 3 is a diagram illustrating an example of a hardware implementation for a vehicle behavior prediction system, according to aspects of the present disclosure.

FIG. 3 is a diagram illustrating an example of a hardware implementation for a vehicle behavior prediction system 300, according to aspects of the present disclosure. The vehicle behavior prediction system 300 may be configured to learn polynomial basis functions to enable vehicle trajectory prediction. The vehicle behavior prediction system 300 may be a component of a vehicle, a robotic device, or other non-autonomous device (e.g., non-autonomous vehicles, ride-share cars, etc.). For example, as shown in FIG. 3, the vehicle behavior prediction system 300 is a component of a car 350.

Aspects of the present disclosure are not limited to the vehicle behavior prediction system 300 being a component of the car 350. Other devices, such as a bus, motorcycle, or other like non-autonomous vehicle, are also contemplated for implementing the vehicle behavior prediction system 300. In this example, the car 350 may be autonomous or semi-autonomous; however, other configurations for the car 350 are contemplated, such as an advanced driver assistance system (ADAS).

The vehicle behavior prediction system 300 may be implemented with an interconnected architecture, represented by an interconnect 336, such as a controller area network (CAN) bus. The interconnect 336 may include any number of point-to-point interconnects, CAN buses, and/or bridges depending on the specific application of the vehicle behavior prediction system 300 and the overall design constraints. The interconnect 336 links together various circuits including one or more processors and/or hardware modules, represented by a vehicle perception module 302, a vehicle ADAS planner 310, a processor 320, a computer-readable medium 322, a communication module 324, a location module 326, a locomotion module 328, an onboard unit 330, and a planner/controller module 340. The interconnect 336 may also link various other circuits such as timing sources, peripherals, voltage regulators, and power management circuits, which are well known in the art, and therefore, will not be described any further.

The vehicle behavior prediction system 300 includes a transceiver 332 coupled to the vehicle perception module 302, the vehicle ADAS planner 310, the processor 320, the computer-readable medium 322, the communication module 324, the location module 326, the locomotion module 328, the onboard unit 330, and the planner/controller module 340. The transceiver 332 is coupled to an antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle ADAS planner 310 to/from connected vehicles within the vicinity of the car 350.

The vehicle behavior prediction system 300 includes the processor 320 coupled to the computer-readable medium 322. The processor 320 performs processing, including the execution of software stored on the computer-readable medium 322 to provide vehicle behavior prediction functionality according to the disclosure. The software, when executed by the processor 320, causes the vehicle behavior prediction system 300 to perform the various functions described for vehicle behavior prediction (e.g., vehicle trajectory prediction) of the car 350, or any of the modules (e.g., 302, 310, 324, 326, 328, and/or 340). The computer-readable medium 322 may also be used for storing data that is manipulated by the processor 320 when executing the software.

The vehicle perception module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LIDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the vehicle perception module 302, the vehicle ADAS planner 310, the communication module 324, the location module 326, the locomotion module 328, the onboard unit 330, and/or the planner/controller module 340. In conjunction with the computer-readable medium 322, the measurements of the first sensor 306 and the second sensor 304 are processed to implement the vehicle behavior prediction functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 326 may determine a location of the car 350. For example, the location module 326 may use a global positioning system (GPS) to determine the location of the car 350. The location module 326 may implement a dedicated short-range communication (DSRC)-compliant GPS unit. A DSRC-compliant GPS unit includes hardware and software to make the car 350 and/or the location module 326 compliant with one or more of the following DSRC standards, including any derivative or fork thereof: EN 12253:2004 Dedicated Short-Range Communication— Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, WiFi, long term evolution (LTE), 4G, 3G, etc. The communication module 324 may also communicate with other components of the car 350 that are not modules of the vehicle behavior prediction system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VOLTE, or any other mobile data network or combination of mobile data networks. Further, the network access point 360 may include one or more IEEE 802.11 wireless networks.

The vehicle behavior prediction system 300 also includes the planner/controller module 340 for planning a route and controlling the locomotion of the car 350, via the locomotion module 328 for intervention operation of the car 350. In one configuration, the planner/controller module 340 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower-level number. These distinct levels of autonomous vehicles are described briefly below.

Level 0: In a Level 0 vehicle, the set of advanced driver assistance system (ADAS) features installed in a vehicle provide no vehicle control but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the district where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle ADAS planner 310 may be in communication with the vehicle perception module 302, the processor 320, the computer-readable medium 322, the communication module 324, the location module 326, the locomotion module 328, the location module 326, the onboard unit 330, and the transceiver 332. In one configuration, the vehicle ADAS planner 310 receives sensor data from the vehicle perception module 302. The vehicle perception module 302 may receive the sensor data from the first sensor 306 and the second sensor 304. According to aspects of the disclosure, the vehicle perception module 302 may filter the data to remove noise, encode the data, decode the data, merge the data, extract frames, or perform other functions. In an alternate configuration, the vehicle ADAS planner 310 may receive sensor data directly from the first sensor 306 and the second sensor 304 to determine, for example, input traffic data images.

In parallel autonomy systems, a human driver and an autonomous system share control of a vehicle. When a driver's actions place the vehicle and the surroundings of the vehicle at risk, the autonomous system is triggered to intervene and provide an alternative action for avoiding a calamity. Successful planning of these alternative actions for the vehicle during intervention by the autonomous system involves knowledge of a driver's intention. In particular, trajectory prediction of the vehicle is a vital component in improving advanced driver assistance systems (ADAS) to enhance vehicle safety.

Several properties are specified for successful and actionable prediction of a human driver's intent. For example, prediction models reason about the inherent uncertainty of a future trajectory in both the immediate term and the longer term. In particular, these prediction models leverage all available sensory cues and use these sensory cues to reason about when the risk of the driver's control choices outweigh the risk of ADAS intervention. While conventional trajectory prediction algorithms output deterministic results efficiently, these methods fail to capture the uncertain nature of human actions.

Current technologies may rely on a long short-term memory (LSTM), such as a social generative adversarial network (GAN), multilayer-perceptron (MLP), and/or polynomial-based models to perform prediction. Regarding uncertainty estimates, GAN and/or variational autoencoder (VAE) based samples or per-timestep covariance functions are usually utilized. These GAN and/or VAE based samples, however, do not compute the likelihood of a given trajectory (e.g., for driver modeling). Furthermore, per-timestep covariance functions ignore the dependency between timesteps.

In some aspects of the present disclosure, a prediction of an ego/adversary vehicle is performed with a function selected using a neural network, such as a long short-term memory (LSTM) network. Depending on the function selected by the LSTM network, coefficients of the selected function are subsequently used to weigh the selected function to provide a distribution regarding a prediction of the actions of the ego/adversary vehicle. Unlike the prior art, this methodology of performing predictions provides the ability to determine the following: (1) the actions the ego/adversary vehicle can perform and (2) the likelihood that the ego/adversary vehicle will perform a specific action. These aspects of the present disclosure are supported using learned polynomial basis functions, which allow for an efficient representation of non-IID (independent and identically distributed) covariance with a simple projection and matrix-vector multiplications.

As shown in FIG. 3, the vehicle ADAS planner 310 includes a basis function network model 312, a vehicle action prediction module 314, a projection coefficient computation module 316, and a vehicle action likelihood module 318. The basis function network model 312, the vehicle action prediction module 314, the projection coefficient computation module 316, and the vehicle action likelihood module 318 may be components of a same or different artificial neural network, such as a deep convolutional neural network (CNN). The vehicle ADAS planner 310 is not limited to a CNN. The vehicle ADAS planner 310 receives a 2D RGB image from the vehicle perception module 302, which processes a data stream from the first sensor 306 and/or the second sensor 304. The data stream may include a 2D RGB image from the first sensor 306 and LIDAR data points from the second sensor 304. The data stream may include multiple frames, such as image frames of traffic data.

The basis function network model 312 may be configured to train a neural network to a learned set of polynomial basis functions. For example, the basis function network model 312 may be configured to learn a polynomial trajectory basis function and/or a set of polynomial trajectory basis functions. The vehicle action prediction module 314 may be configured to select a learned polynomial basis function to perform a prediction of an action of an ego/adversary vehicle. In these aspects of the present disclosure, the vehicle action prediction module 314 is configured to predict a trajectory of the car 350 using a learned polynomial trajectory basis function and/or a set of learned polynomial trajectory basis functions during motion planning of the car 350.

Once the action of the ego/adversary vehicle is predicted, the projection coefficient computation module 316 computes projection coefficients of the selected polynomial basis function to weigh the selected polynomial basis function. For example, the vehicle action prediction module 314 predicts the trajectory of the car 350. As noted, trajectory prediction is difficult in complicated traffic environments. For example, these traffic environments may involve complex interactions between vehicles, including situations where a controlled (ego) vehicle maneuvers into and out of traffic lanes. Conventional ADAS techniques for vehicle control intervention may use a network to select an appropriate vehicle intervention action based on a predicted trajectory of the car. Unfortunately, conventional ADAS techniques do not consider inherent uncertainty of trajectory prediction.

By contrast, some aspects of the present disclosure rely on the vehicle action likelihood module 318 to use the projection coefficients of the selected polynomial basis function to weigh the selected polynomial basis function to provide a distribution regarding the prediction of the action of the ego/adversary vehicle. Unlike the prior art, some aspects of the present disclosure provide the ability to determine (1) the actions the ego/adversary vehicle can perform and (2) the likelihood that the ego/adversary vehicle will perform a specific action. These aspects of the present disclosure are supported using learned polynomial basis functions, which allow for an efficient representation of non-IID covariance with a simple projection and matrix-vector multiplications using the vehicle ADAS planner 310.

Various aspects of the present disclosure may be implemented in an agent, such as a vehicle. The vehicle may operate in either an autonomous mode, a semi-autonomous mode, or a manual mode. In some examples, the vehicle may switch between operating modes.

Figure 4A:
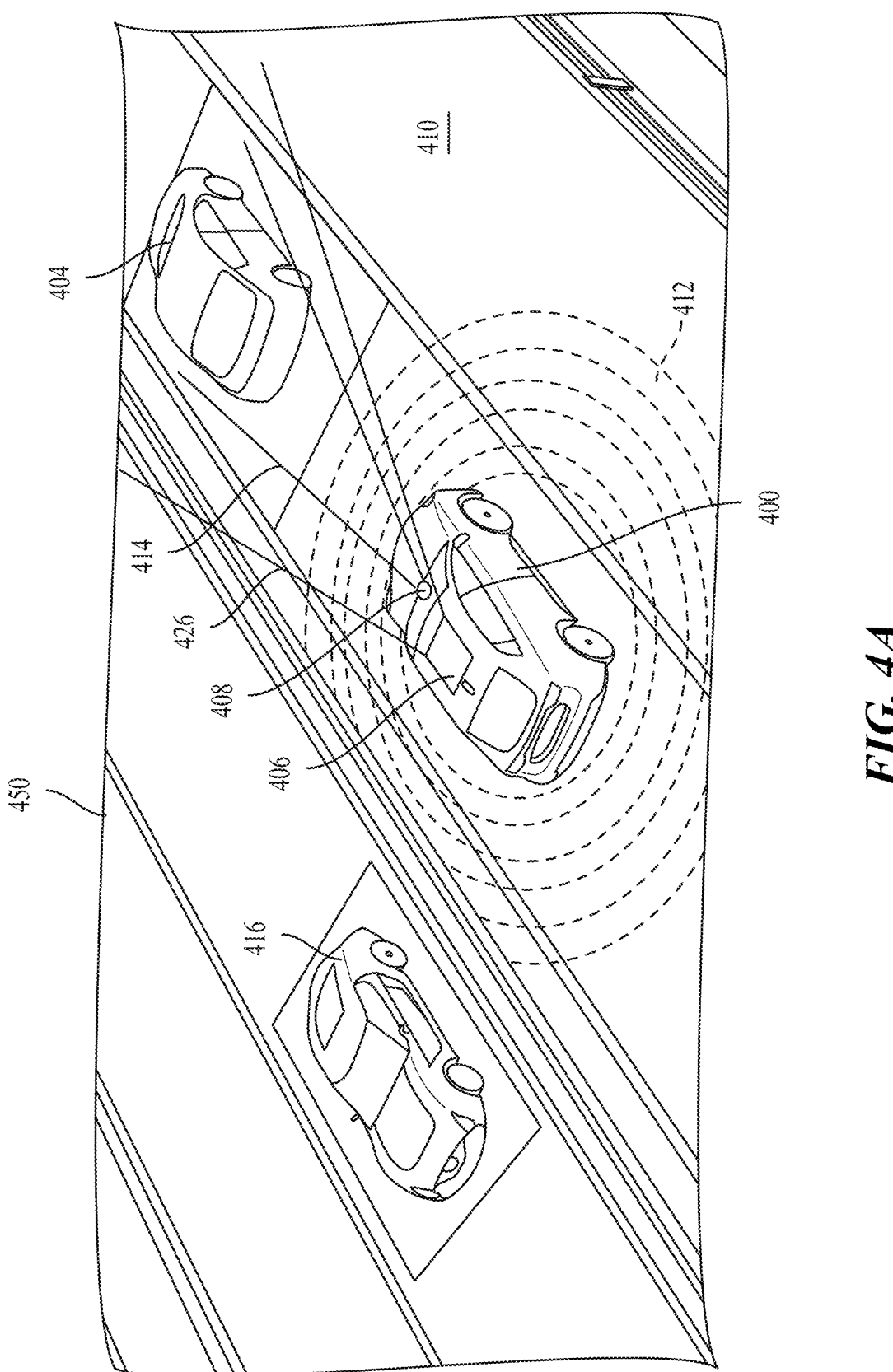
FIGS. 4A-4B are diagrams illustrating an example of a vehicle in an environment, according to various aspects of the present disclosure.
Figure 4B:
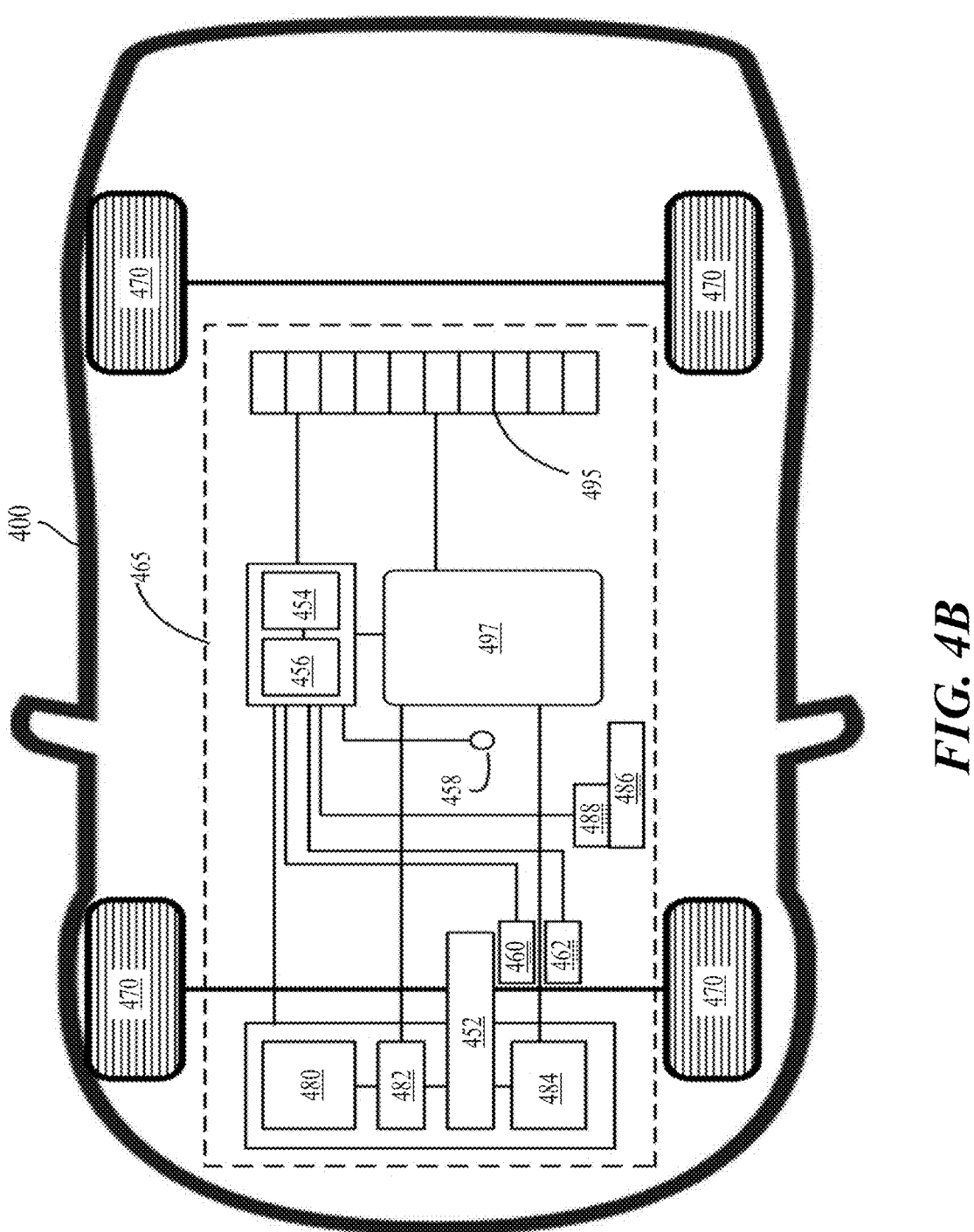

FIGS. 4A and 4B are diagrams illustrating an example of a vehicle 400 in an environment 450, in accordance with various aspects of the present disclosure. In the example of FIG. 4A, the vehicle 400 may be an autonomous vehicle, a semi-autonomous vehicle, or a non-autonomous vehicle. As shown in FIG. 4A, the vehicle 400 may be traveling on a road 410. A first vehicle 404 may be ahead of the vehicle 400 and a second vehicle 416 may be adjacent to the vehicle 400. In this example, the vehicle 400 may include a 2D camera 408, such as a 2D red-green-blue (RGB) camera, and a LIDAR sensor 406. The 2D camera 408 and the LIDAR sensor 406 may be components of an overall sensor system (e.g., the vehicle perception module 302). Other sensors, such as radar and/or ultrasound, are also contemplated. Additionally, or alternatively, although not shown in FIG. 4A, the vehicle 400 may include one or more additional sensors, such as a camera, a radar sensor, and/or a LIDAR sensor, integrated with the vehicle in one or more locations, such as within one or more storage locations (e.g., a trunk). Additionally, or alternatively, although not shown in FIG. 4A, the vehicle 400 may include one or more force measuring sensors.

In one configuration, the 2D camera 408 captures a 2D image that includes objects in the 2D camera's 408 field of view 414. The LIDAR sensor 406 may generate one or more output streams. The first output stream may include a three-dimensional (3D) cloud point of objects in a first field of view, such as a 360° field of view 412 (e.g., bird's eye view). The second output stream 424 may include a 3D cloud point of objects in a second field of view, such as a forward-facing field of view, such as the 2D camera's 408 field of view 414 and/or the 2D sensor's 406 field of view 426.

The 2D image captured by the 2D camera 408 includes a 2D image of the first vehicle 404, as the first vehicle 404 is in the 2D camera's 408 field of view 414. As is known to those of skill in the art, a LIDAR sensor 406 uses laser light to sense the shape, size, and position of objects in an environment. The LIDAR sensor 406 may vertically and horizontally scan the environment. In the current example, the artificial neural network (e.g., autonomous driving system) of the vehicle 400 may extract height and/or depth features from the first output stream. In some examples, an autonomous driving system of the vehicle 400 may also extract height and/or depth features from the second output stream 424.

The information obtained from the LIDAR sensor 406 and the 2D camera 408 may be used to evaluate a driving environment. In some examples, the information obtained from the LIDAR sensor 406 and the 2D camera 408 may identify whether the vehicle 400 is at an intersection or a crosswalk. Additionally, or alternatively, the information obtained from the LIDAR sensor 406 and the 2D camera 408 may identify whether one or more dynamic objects, such as pedestrians, are near the vehicle 400.

FIG. 4B is a diagram illustrating an example of a vehicle 400, in accordance with various aspects of the present disclosure. It should be understood that various aspects of the present disclosure may be directed to an autonomous vehicle. The autonomous vehicle may be an internal combustion engine (ICE) vehicle, fully electric vehicle (EV), or another type of vehicle. The vehicle 400 may include drive force unit 465 and wheels 470. The drive force unit 465 may include an engine 480, motor generators (MGs) 482 and 484, a battery 495, an inverter 497, a brake pedal 486, a brake pedal sensor 488, a transmission 452, a memory 454, an electronic control unit (ECU) 456, a shifter 458, a speed sensor 460, and an accelerometer 462.

The engine 480 primarily drives the wheels 470. The engine 480 can be an ICE that combusts fuel, such as gasoline, ethanol, diesel, biofuel, or other types of fuels which are suitable for combustion. The torque output by the engine 480 is received by the transmission 452. The MGs 482 and 484 can also output torque to the transmission 452. The engine 480 and the MGs 482 and 484 may be coupled through a planetary gear (not shown in FIG. 4B). The transmission 452 delivers an applied torque to one or more of the wheels 470. The torque output by the engine 480 does not directly translate into the applied torque to the one or more wheels 470.

The MGs 482 and 484 can serve as motors which output torque in a drive mode and can serve as generators to recharge the battery 495 in a regeneration mode. The electric power delivered from or to the MGs 482 and 484 passes through the inverter 497 to the battery 495. The brake pedal sensor 488 can detect pressure applied to the brake pedal 486, which may further affect the applied torque to the wheels 470. The speed sensor 460 is connected to an output shaft of the transmission 452 to detect a speed input which is converted into a vehicle speed by the ECU 456. The accelerometer 462 is connected to the body of the vehicle 400 to detect the actual deceleration of the vehicle 400, which corresponds to a deceleration torque.

The transmission 452 may be a transmission suitable for any vehicle. For example, the transmission 452 can be an electronically controlled continuously variable transmission (ECVT), which is coupled to the engine 480 as well as to the MGs 482 and 484. The transmission 452 can deliver torque output from a combination of the engine 480 and the MGs 482 and 484. The ECU 456 controls the transmission 452, utilizing data stored in the memory 454 to determine the applied torque delivered to the wheels 470. For example, the ECU 456 may determine that at a certain vehicle speed, the engine 480 should provide a fraction of the applied torque to the wheels 470 while one or both of the MGs 482 and 484 provide most of the applied torque. The ECU 456 and the transmission 452 can control an engine speed (NE) of the engine 480 independently of the vehicle speed (V).

The ECU 456 may include circuitry to control the above aspects of vehicle operation. Additionally, the ECU 456 may include, for example, a microcomputer that includes one or more processing units (e.g., microprocessors), memory storage (e.g., RAM, ROM, etc.), and I/O devices. The ECU 456 may execute instructions stored in memory to control one or more electrical systems or subsystems in the vehicle 400. Furthermore, the ECU 456 can include one or more electronic control units such as, for example, an electronic engine control module, a powertrain control module, a transmission control module, a suspension control module, a body control module, and so on. As a further example, electronic control units may control one or more systems and functions such as doors and door locking, lighting, human-machine interfaces, cruise control, telematics, braking systems (e.g., anti-lock braking system (ABS) or electronic stability control (ESC)), or battery management systems, for example. These various control units can be implemented using two or more separate electronic control units, or a single electronic control unit.

The MGs 482 and 484 each may be a permanent magnet type synchronous motor including, for example, a rotor with a permanent magnet embedded therein. The MGs 482 and 484 may each be driven by an inverter controlled by a control signal from the ECU 456, so as to convert direct current (DC) power from the battery 495 to alternating current (AC) power and supply the AC power to the MGs 482 and 484. In some examples, a first MG 482 may be driven by electric power generated by a second MG 484. It should be understood that in embodiments where MGs 482 and 484 are DC motors, no inverter is required. The inverter 497, in conjunction with a converter assembly, may also accept power from one or more of the MGs 482 and 484 (e.g., during engine charging), convert this power from AC back to DC, and use this power to charge the battery 495 (hence the name, motor generator). The ECU 456 may control the inverter 497, adjust driving current supplied to the first MG 482, and adjust the current received from the second MG 484 during regenerative coasting and braking.

The battery 495 may be implemented as one or more batteries or other power storage devices including, for example, lead-acid batteries, lithium ion and nickel batteries, capacitive storage devices, and so on. The battery 495 may also be charged by one or more of the MGs 482 and 484, such as, for example, by regenerative braking or coasting, during which one or more of the MGs 482 and 484 operates as a generator. Alternatively, or additionally, the battery 495 can be charged by the first MG 482, for example, when the vehicle 400 is idle (not moving/not in drive). Further still, the battery 495 may be charged by a battery charger (not shown) that receives energy from the engine 480. The battery charger may be switched or otherwise controlled to engage/disengage it with the battery 495. For example, an alternator or generator may be coupled directly or indirectly to a drive shaft of the engine 480 to generate an electrical current as a result of the operation of the engine 480. Still other embodiments contemplate the use of one or more additional motor generators to power the rear wheels of the vehicle 400 (e.g., in vehicles equipped with 4-Wheel Drive), or using two rear motor generators, each powering a rear wheel.

The battery 495 may also power other electrical or electronic systems in the vehicle 400. In some examples, the battery 495 can include, for example, one or more batteries, capacitive storage units, or other storage reservoirs suitable for storing electrical energy that can be used to power one or both of the MGs 482 and 484. When the battery 495 is implemented using one or more batteries, the batteries can include, for example, nickel metal hydride batteries, lithium-ion batteries, lead acid batteries, nickel cadmium batteries, lithium-ion polymer batteries, or other types of batteries.

The vehicle 400 may operate in one of an autonomous mode, a manual mode, or a semi-autonomous mode. In the manual mode, a human driver manually operates (e.g., controls) the vehicle 400. In the autonomous mode, an autonomous control system (e.g., autonomous driving system) operates the vehicle 400 without human intervention. In the semi-autonomous mode, the human may operate the vehicle 400, and the autonomous control system may override or assist the human. For example, the autonomous control system may override the human to prevent a collision or to obey one or more traffic rules.

Figure 5:
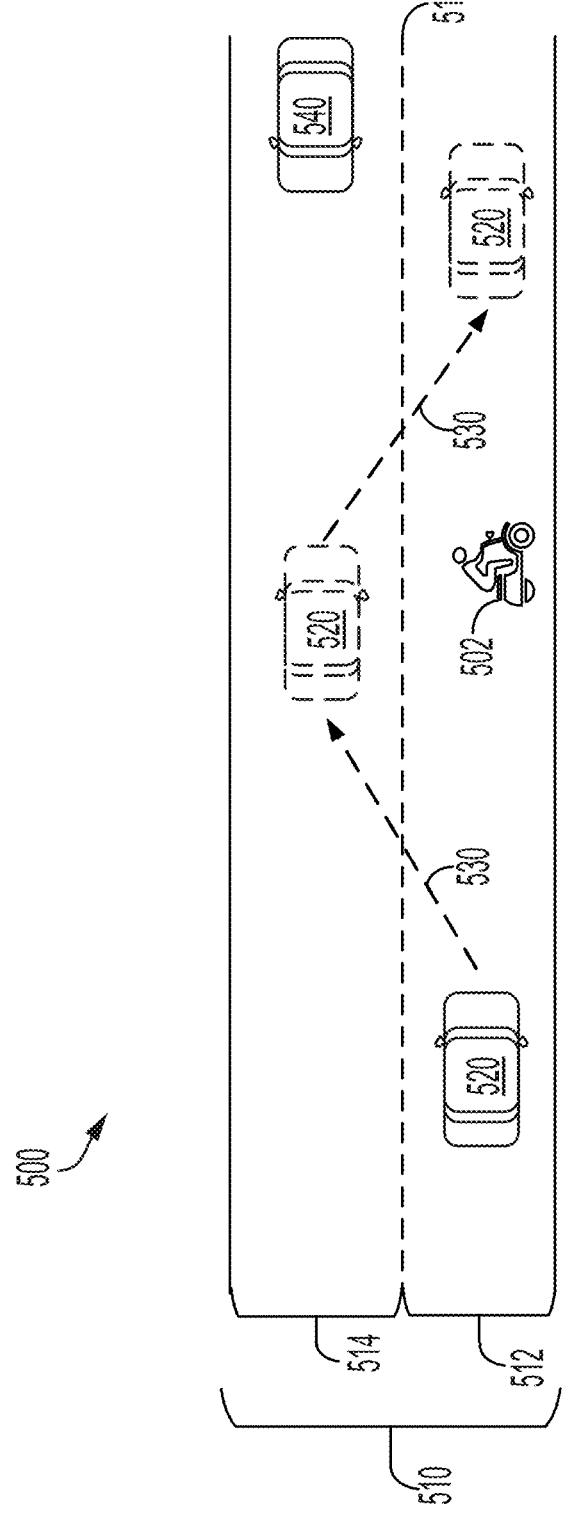
FIG. 5 is a diagram illustrating an overview of a roadway environment, including a vehicle in a first lane of a roadway including a cycle in which an action of an ego/adversary vehicle is predicted, according to aspects of the present disclosure.

FIG. 5 is a diagram illustrating an overview of a roadway environment, including a vehicle in a first lane of a roadway including a cycle in which an action of an ego/adversary vehicle is predicted, according to aspects of the present disclosure. In this example, a roadway environment 500 includes a roadway 510, having a first lane 512 and a second lane 514, in which a cycle 502 is in the first lane 512 and an oncoming vehicle 540 is in the second lane 514. A vehicle 520 is traveling in the first lane 512, and an operator of the vehicle 520 believes the second lane 514 is empty because the operator is focused on the cycle 502. In this example, the vehicle operator may plan for the vehicle 520 to cross a dashed center line 516 to change lanes from the first lane 512 to the second lane 514 and back to the first lane 512 to avoid the cycle 502, as shown by a trajectory 530. This trajectory 530, however, may lead to a collision with the oncoming vehicle 540 (e.g., an external road agent). In this example, the vehicle 520, may be the car 350, shown in FIG. 3.

In some aspects of the present disclosure, an ADAS subsystem of the vehicle 520 dynamically determines (1) what actions can be performed by an ego/adversary vehicle, and (2) what is the likelihood that the ego/adversary vehicle performs a specific action. In some aspects of the present disclosure, the ADAS subsystem relies on a prediction model which utilizes several properties for successful and actionable prediction of a human driver's intent. For example, the prediction model reasons about the inherent uncertainty of a future trajectory in both the immediate term and the longer term. In particular, the prediction models leverage all available sensory cues and uses these sensory cues to reason about when the risk of the driver's control choices outweigh the risk of ADAS intervention. In contrast to conventional trajectory prediction algorithms, aspects of the present disclosure are directed to a vehicle behavior prediction system that captures the uncertain nature of human actions, for example, as shown in FIG. 6.

Figure 6:
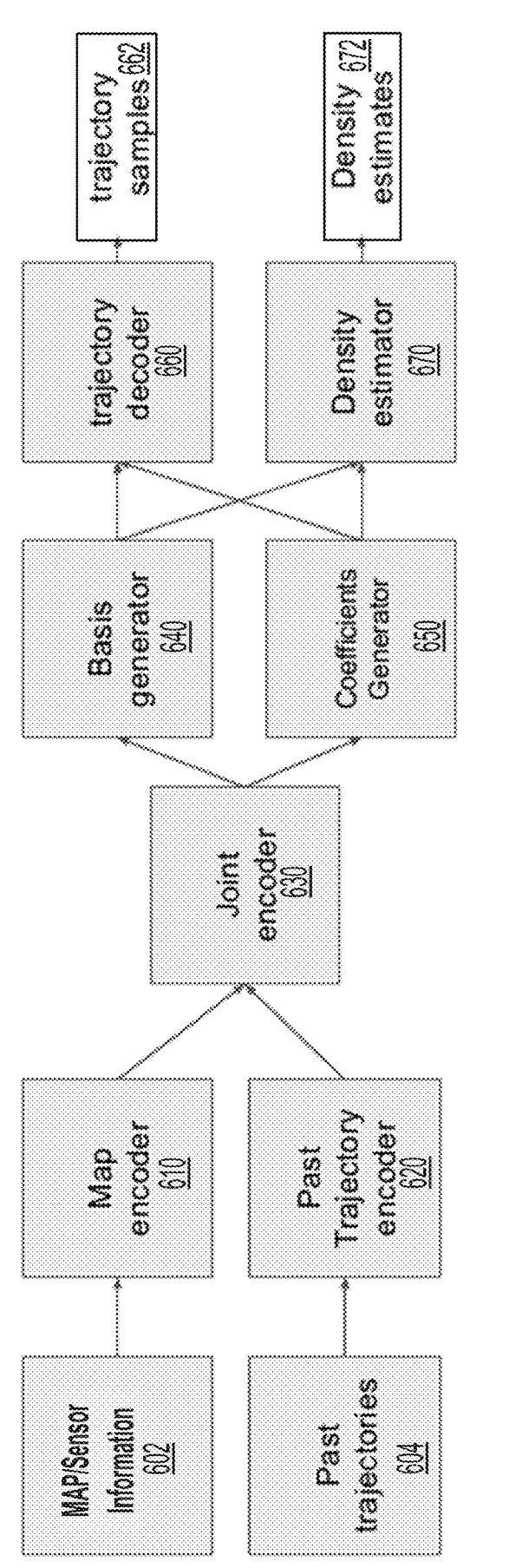
FIG. 6 is a block diagram of a driver modeling system for vehicle trajectory prediction and a likelihood of the prediction, according to aspects of the present disclosure.

FIG. 6 is a block diagram of a driver modeling system for vehicle trajectory prediction and a likelihood of the prediction, according to aspects of the present disclosure. As described, the trajectories, projected onto some polynomial basis, are assumed to form a Gaussian mixture model (GMM) with diagonal covariance matrices. Given a trajectory $\tau(t): [0; T] \rightarrow R^2$ and basis function B(t), the projection coefficient c can be computed using Equation (1). By contrast, given (sampling-dependent) basis B and coefficients c, the trajectory computed using Equation (1)

$$c = Proj_B(\tau), \tau = Bc \qquad (1)$$

Some aspects of the present disclosure are directed to utilizing learned polynomial basis functions B(t) to allow for an efficient representation of non-IID (independent and identically distributed) covariance with a simple projection and matrix-vector multiplications. In this configuration, a driver modeling system 600 utilizes learned polynomial basis functions B(t) to perform a prediction with a trajectory basis and/or a set of trajectory functions. At runtime, the driver modeling system 600 receives map/sensor information 602 from an ego vehicle, which is encoded by a map encoder 610 to provide a map/sensor information latent space. Additionally, past trajectories 604 are received and a past trajectory encoder 620 is processed to provide a past trajectory latent space.

During training, a vehicle driver is sampled to determine actions of the driver. Next, known trajectories are analyzed to determine whether the known trajectories match any of the possible actions of the driver. When a match exists, the matching trajectory and the driver's actions are used to determine the basis B and coefficients c according to Equation (1). In some aspects of the present disclosure, this process is used to train a joint encoder network 630 to learn the polynomial basis functions B(t) and coefficients c according to Equation (1).

During runtime, the learned polynomial basis functions are generated by a basis generator network 640, and a trajectory decoder 660 performs a prediction in a low-dimensional space using a projection onto the learned polynomial basis functions from the basis generator network, for example, using Equation (1). In some aspects of the present disclosure, the trajectory decoder 660 generates the basis function, for example, including a pointer network to perform low rank representations. In some aspects of the present disclosure, the basis function to perform the prediction of the ego/adversary vehicle is selected using the basis generator network, which may be implemented as a long short-term memory (LSTM) network.

Additionally, the driver modeling system 600 includes a coefficients generator network 650. Given the basis function selected by the basis generator network 640, the coefficients generator network 650 generates coefficients corresponding to the selected basis function, as well as Gaussian mixture model (GMM) parameters for action prediction including weights ($\omega$), means ($\mu$), and variances ($\sigma$). Subsequently, whatever function is selected by the basis generator network 640, a density estimator 670 utilizes the coefficients of the selected basis function to weigh the selected basis function and provide a distribution regarding a prediction of the actions of the ego/adversary vehicle.

Unlike the prior art, this methodology performing the prediction gives us the ability to determine the following: (1) what actions can be performed by the ego/adversary vehicle, and (2) what is the likelihood that the ego/adversary vehicle performs a specific action. Some aspects of the present disclosure utilize learned polynomial basis functions for an efficient representation of non-IID (independent and identically distributed) covariance with a simple projection and matrix-vector multiplications. These aspects of the present disclosure are directed to more accurate and efficient predictions in the context of autonomous or semi-autonomous vehicles, including both ego-vehicle predictions, adversarial-agent predictions, and pedestrian predictions. In some aspect of the present disclosure, the trajectory samples 662 and the density estimates 672 provided by the driver modeling system 600 enable formation of a heat map, for example, as shown in FIG. 7.

Figure 7:
FIG. 7 is a block diagram illustrating a time-based heatmap, according to various aspects of the present disclosure.

FIG. 7 is a block diagram illustrating a time-based heatmap 700, according to various aspects of the present disclosure. In some aspects of the present disclosure, the time-based heatmap 700 is generated by overlaying a predefined area of an image based on a predetermined number of time steps (e.g., T, T+1, T+2, and T+3). In some aspects of the present disclosure, the basis generator network 640 generates basis functions over space and time. For example, space may be plus or minus 100 meters around the vehicle to provide a 200 by 200-meter area broken into half-meter intervals. This configurate provides a 400 by 400 image over, for example, 20 timesteps to cover half-second intervals, looking 10 seconds into the future, which forms a 3D alley, Additionally, the weights ($\omega$), means ($\mu$), and variances ($\sigma$) of the GMM parameters from the coefficients generator network 650 are sampled by the density estimator 670 to provide density estimates 672, indicating an occupancy of the vehicle to sample possible outcomes. In some aspects of the present disclosure, the time-based heatmap 700 is used for motion planning of an ego vehicle, for example, as shown in FIGS. 4A and 4B. A method for a driver prediction system is shown, for example, in FIG. 8.

Figure 8:
FIG. 8 is a flowchart illustrating a method driver prediction system, according to aspects of the present disclosure.
Figure 8:
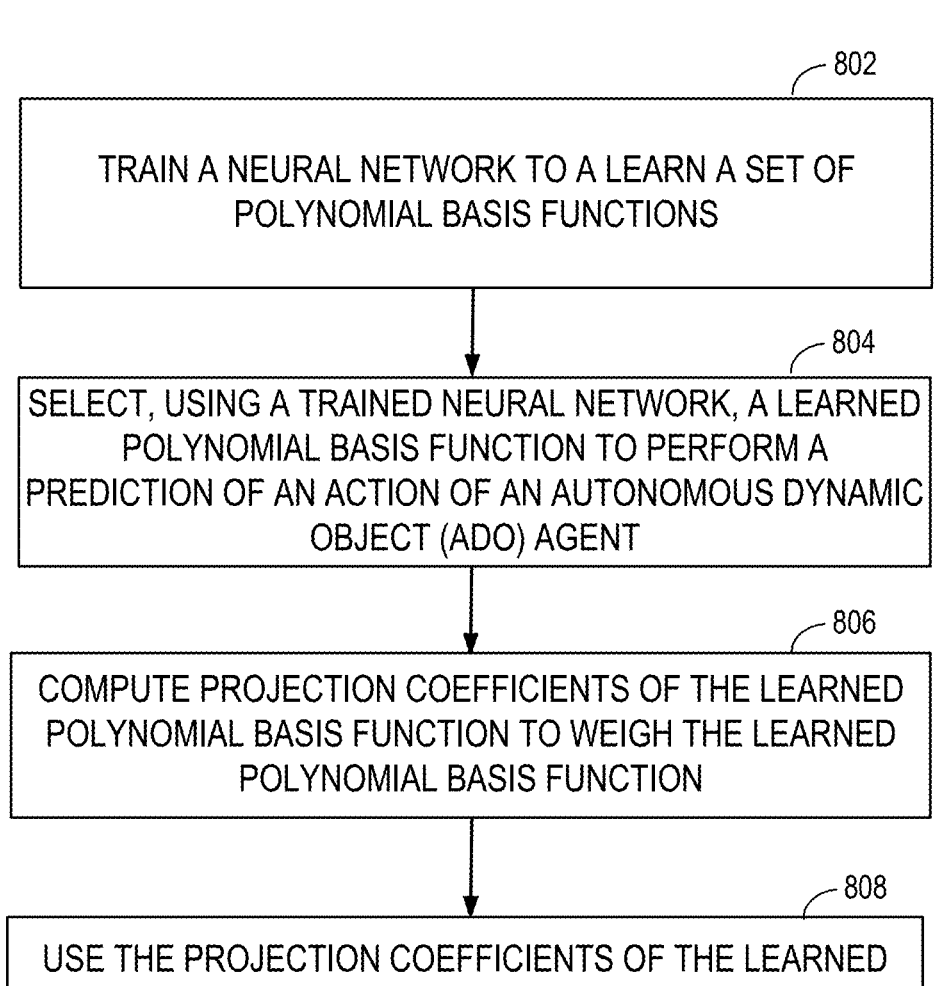

FIG. 8 is a flowchart illustrating a method driver prediction system, according to aspects of the present disclosure. A method 800 begins at block 802, in which a neural network is trained to a learn a set of polynomial basis functions. For example, as shown in FIG. 3, the basis function network model 312 may be configured to train a neural network to a learned set of polynomial basis functions. For example, the basis function network model 312 may be configured to learn a polynomial trajectory basis function and/or a set of polynomial trajectory basis functions.

At block 804, a learned polynomial basis function is selected using a trained neural network to perform a prediction of an action of an autonomous dynamic object (ADO) agent. For example, as shown in FIG. 3, the vehicle action prediction module 314 may be configured to select a learned polynomial basis function to perform a prediction of an action of an ego/adversary vehicle. In these aspects of the present disclosure, the vehicle action prediction module 314 is configured to predict a trajectory of the car 350 using a learned polynomial trajectory basis function and/or a set of learned polynomial trajectory basis functions during motion planning of the car 350.

At block 806, projection coefficients of the learned polynomial basis function are computed to weigh the learned polynomial basis function. For example, as shown in FIG. 3, once the action of the ego/adversary vehicle is predicted, the projection coefficient computation module 316 computes projection coefficients of the selected polynomial basis function to weigh the selected polynomial basis function. For example, the vehicle action prediction module 314 predicts the trajectory of the car 350. As noted, trajectory prediction is difficult in complicated traffic environments. For example, these traffic environments may involve complex interactions between vehicles, including situations where a controlled (ego) vehicle maneuvers into and out of traffic lanes. Conventional ADAS techniques for vehicle control intervention may use a network to select an appropriate vehicle intervention action based on a predicted trajectory of the car. Unfortunately, conventional ADAS techniques do not consider inherent uncertainty of trajectory prediction.

At block 808, the projection coefficients of the learned polynomial basis function are used to weigh the learned polynomial basis function to provide a distribution regarding a likelihood of the prediction of the action of the ADO agent. For example, as shown in FIG. 3, some aspects of the present disclosure rely on the vehicle action likelihood module 318 to use the projection coefficients of the selected polynomial basis function to weigh the selected polynomial basis function to provide a distribution regarding the prediction of the action of the ego/adversary vehicle. Unlike the prior art, some aspects of the present disclosure provide the ability to determine (1) the actions the ego/adversary vehicle can perform and (2) the likelihood that the ego/adversary vehicle will perform a specific action. These aspects of the present disclosure are supported using learned polynomial basis functions, which allow for an efficient representation of non-IID covariance with a simple projection and matrix-vector multiplications using the vehicle ADAS planner 310.

The method 800 also includes learning by selecting a driving log of vehicle trajectories. The method 800 also includes projecting the vehicle trajectories onto learning basis functions to determine a coefficient vector. The method 800 further includes minimizing a log probability of the vehicle trajectories according to the basis functions and a Gaussian mixture model, for example, according to Equation (1). The method 800 further includes selecting a space area around an ego vehicle broken into selected distance intervals. The method 800 also includes generating a heatmap based on the space area and a predetermined number of timesteps to cover a predetermined number of second intervals and looking a predetermined number of seconds into a future to form a 3D alley. The method 800 further includes planning a trajectory of an ego vehicle according to the heatmap, in which the heatmap illustrates adversary agents and pedestrians.

In some aspects of the present disclosure, the method shown in FIG. 8 may be performed by the SOC 100 (FIG. 1) or the software architecture 200 (FIG. 2) of the autonomous vehicle 150. That is, each of the elements or methods may, for example, but without limitation, be performed by the SOC 100, the software architecture 200, the processor (e.g., CPU 102) and/or other components included therein of the autonomous vehicle 150, or the vehicle behavior prediction system 300 and/or the driver modeling system of FIG. 6.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in several ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for a driver prediction system, the method comprising:
   training a neural network to learn a set of polynomial basis functions;
   selecting, using a trained neural network, a learned polynomial basis function to perform a prediction of an action of an autonomous dynamic object (ADO) agent;
   computing projection coefficients of the learned polynomial basis function to weigh the learned polynomial basis function;
   matching sampled behaviors of a driver of the ADO agent with known trajectories to update the computed projection coefficients;
   using the updated, computed projection coefficients of the learned polynomial basis function to weigh the learned polynomial basis function to provide a distribution regarding a likelihood of the prediction of the action of the ADO agent; and
   controlling a planned trajectory of an ego vehicle according to a predicted, future trajectory of the ADO agent and the prediction of the action of the ADO agent.

2. The method of claim 1, in which training comprises learning, by the neural network, a polynomial trajectory basis function or the set of polynomial trajectory basis functions.

3. The method of claim 1, in which selecting comprises decoding, by a long short-term memory (LSTM) network, a polynomial trajectory basis function.

4. The method of claim 1, in which selecting further comprises utilizing a learned polynomial trajectory basis function or a set of learned polynomial trajectory basis functions to predict a trajectory of the ADO agent.

5. The method of claim 1, in which learning comprises:
   selecting a driving log of vehicle trajectories;
   projecting the vehicle trajectories onto learning basis functions to determine a coefficient vector; and
   minimizing a log probability of the vehicle trajectories according to the basis functions and a Gaussian mixture model.

6. The method of claim 1, further comprises:
   selecting a space area around an ego vehicle broken into selected distance intervals; and
   generating a heatmap based on the space area and a predetermined number of timesteps to cover a predetermined number of second intervals, looking a predetermined number of seconds into a future to form a 3D alley.

7. The method of claim 6, further comprises planning the planned trajectory of the ego vehicle according to the heatmap.

8. The method of claim 6, in which the heatmap illustrates adversary agents and pedestrians.

9. A non-transitory computer-readable medium having program code recorded thereon for a driver prediction system, the program code being executed by a processor and comprising:
   program code to train a neural network to learn a set of polynomial basis functions;
   program code to select, using a trained neural network, a learned polynomial basis function to perform a prediction of an action of an autonomous dynamic object (ADO) agent;
   program code to compute projection coefficients of the learned polynomial basis function to weigh the learned polynomial basis function;

program code to match sampled behaviors of a driver of the ADO agent with known trajectories to update the computed projection coefficients;

program code to use the updated, computed projection coefficients of the learned polynomial basis function to weigh the learned polynomial basis function to provide a distribution regarding a likelihood of the prediction of the action of the ADO agent; and program code to control a planned trajectory of an ego vehicle according to a predicted, future trajectory of the ADO agent and the prediction of the action of the ADO agent.

10. The non-transitory computer-readable medium of claim 9, in which the program code to train comprises program code to learn, by the neural network, a polynomial trajectory basis function or a set of polynomial trajectory basis functions.

11. The non-transitory computer-readable medium of claim 9, in which the program code to select comprises program code to decode, by a long short-term memory (LSTM) network, a polynomial trajectory basis function.

12. The non-transitory computer-readable medium of claim 9, in which the program code to select further comprises program code to utilize a learned polynomial trajectory basis function or a set of learned polynomial trajectory basis functions to predict a trajectory of the ADO agent.

13. The non-transitory computer-readable medium of claim 9, in which the program code to learn comprises:

program code to select a driving log of vehicle trajectories;

program code to project the vehicle trajectories onto learning basis functions to determine a coefficient vector; and program code to minimize a log probability of the vehicle trajectories according to the basis functions and a Gaussian mixture model.

14. The non-transitory computer-readable medium of claim 9, further comprises:

program code to select a space area around an ego vehicle broken into selected distance intervals; and program code to generate a heatmap based on the space area and a predetermined number of timesteps to cover a predetermined number of second intervals, looking a predetermined number of seconds into a future to form a 3D alley.

15. The non-transitory computer-readable medium of claim 14, further comprises planning the planned trajectory of the ego vehicle according to the heatmap.

16. The non-transitory computer-readable medium of claim 14, in which the heatmap illustrates adversary agents and pedestrians.

17. A system for driver prediction, the system comprising:

a basis function network model to train a neural network to learn a set of polynomial basis functions;

a vehicle action prediction module to select, using a trained neural network, a learned polynomial basis function to perform a prediction of an action of an autonomous dynamic object (ADO) agent;

a projection coefficient computation module to compute projection coefficients of the learned polynomial basis function to weigh the learned polynomial basis function and to match sampled behaviors of a driver of the ADO agent with known trajectories to update the computed projection coefficients;

a vehicle action likelihood module to use the updated, computed projection coefficients of the learned polynomial basis function to weigh the learned polynomial basis function to provide a distribution regarding a likelihood of the prediction of the action of the ADO agent; and a controller module to control a planned trajectory of an ego vehicle according to a predicted, future trajectory of the ADO agent and the prediction of the action of the ADO agent.

18. The system of claim 17, in which the vehicle action prediction module comprises a long short-term memory (LSTM) network to decode a polynomial trajectory basis function.

19. The system of claim 17, in which the vehicle action prediction module is further to utilize a learned polynomial trajectory basis function or a set of learned polynomial trajectory basis functions to predict a trajectory of the ADO agent.

20. The system of claim 17, further comprises a planner module to plan the planned trajectory of an ego vehicle according to a generated heatmap, illustrating adversary agents and pedestrians.

* * * * *